United States Patent [19]

Mabuchi et al.

[11] 4,007,455

[45] Feb. 8, 1977

[54] ENERGY CONSERVING PULSE KEYING TECHNIQUE FOR A RADIO CONTROL SYSTEM

[75] Inventors: Kenichi Mabuchi; Koziro Komatsu, both of Tokyo, Japan

[73] Assignee: Mabuchi Motor Co. Ltd., Tokyo, Japan

[22] Filed: July 2, 1975

[21] Appl. No.: 592,558

[30] Foreign Application Priority Data

July 20, 1974 Japan .............................. 49-83373

[52] U.S. Cl. ................................ 343/225; 325/142; 340/167 A

[51] Int. Cl.[2] ............................................ H04B 7/00

[58] Field of Search ........... 340/167 A, 206, 189 R; 325/142, 164, 138; 343/225

[56] References Cited

UNITED STATES PATENTS

| | | | |
|---|---|---|---|
| 2,266,401 | 12/1941 | Reeves | 340/167 A |
| 3,257,651 | 6/1966 | Feisel | 340/206 |

*Primary Examiner*—Glen R. Swann, III

[57] ABSTRACT

In a radio control system of the digital proportional control type in which a control signal whose period comprises a plurality of control pulses and a timing pulse is transmitted to control servomechanisms in response to the time width of each control pulse, the carrier wave exists only for the time between the trailing end of each control pulse and the leading end of the next control pulse, for the time between the trailing end of the timing pulse and the leading end of the first control pulse, and for the time between the leading end of the timing pulse and the trailing end of the last control pulse, in order to minimize consumption of the supply battery.

11 Claims, 15 Drawing Figures a
b
c
d
e
f
0
t01 t02 t03
ts
t1 t2 t3
t0
T
CONT1 CONT2 CONT3 to
t1
t2
t3
ts
g
h
i
j
k
ℓ
0

ENERGY CONSERVING PULSE KEYING TECHNIQUE FOR A RADIO CONTROL SYSTEM

BACKGROUND OF THE INVENTION

1. Field of the Invention

This invention relates to a radio control system, and more particularly, to a radio control system of the digital proportional control type wherein the carrier wave is transmitted only for such periods of time as no carrier wave would be transmitted in conventional systems, thereby to minimize consumption of the supply battery.

2. Description of the Prior Art

At present, digital proportional control systems are known as radio control systems for use with such apparatus as model airplanes. Such a digital proportional control system has the advantages (i) that it enables any number of channels, (ii) that no interference exists between channels, (iii) that the servomechanism can faithfully follow the motion of the control stick on the transmitter as manipulated by the operator.

Thus, according to such a radio control system of the digital proportional control type, the order of occurrence of control pulses with the timing pulse as a standard is made to correspond to the servomechanisms in the receiver, the time width of each control pulse being used to control the servo-mechanism.

However, in the above-mentioned prior art radio control system of the digital proportional control type, the carrier wave is continuously transmitted for the time of duration of each control pulse and the time of duration of the timing pulse. So the lifetime of the supply battery in the transmitter will be a problem especially in the case of controlling a model airplane in the open air.

SUMMARY OF THE INVENTION

An object of the invention is to provide a radio control system of the digital proportional control type in which the carrier wave is transmitted only for the time that neither the control pulses nor the timing pulse exist, that is to say, for the time of logic "0", whereby consumption of the supply battery may be greatly reduced.

Another object of the invention is to provide a radio control system as mentioned above which can be realized by only adding a phase inverter without altering the existing encoder and/or servomechanisms.

Yet another object of the invention is to provide a radio control system as mentioned above in which an amplifying stage is added as the phase inverter.

DETAILED DESCRIPTION OF THE EMBODIMENT

Figure 1:
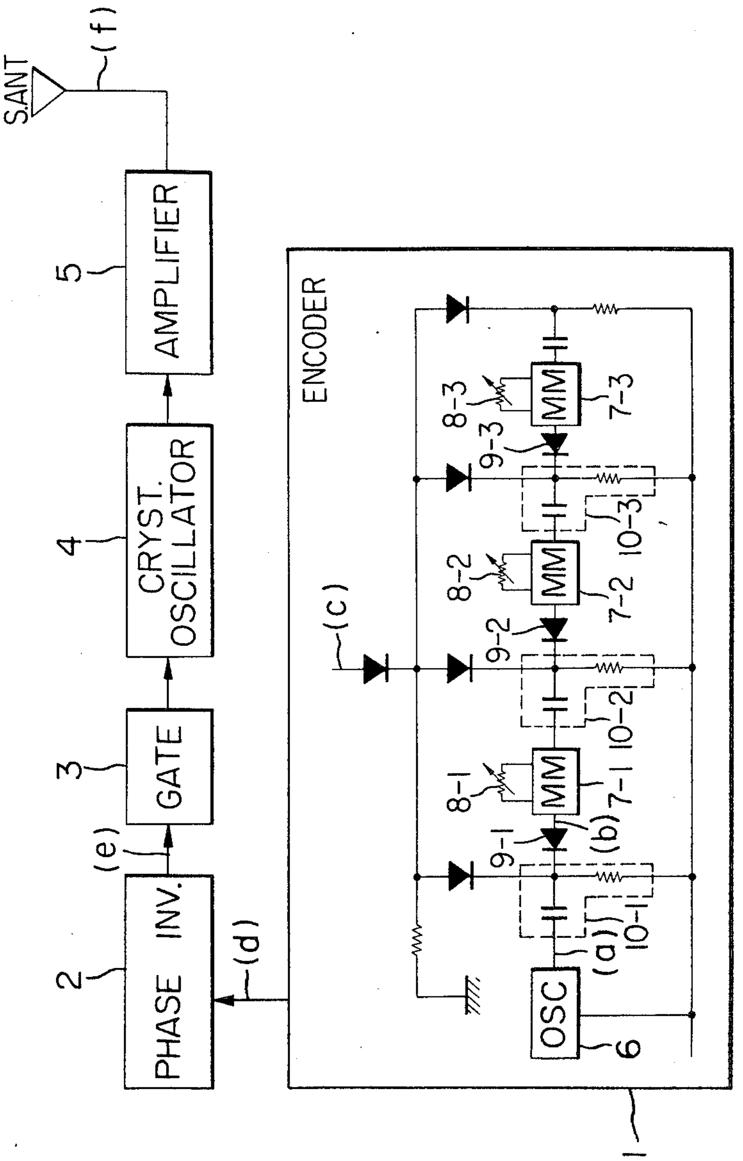
FIG. 1 is a block diagram showing a transmitter embodying the present invention, FIGS. 2A–2G constitute a time chart showing the output wave forms for one period at various points in the above-mentioned transmitter of the radio control system.
Figures 2A, 2B, 2C, 2D, 2E, 2F, 2G:
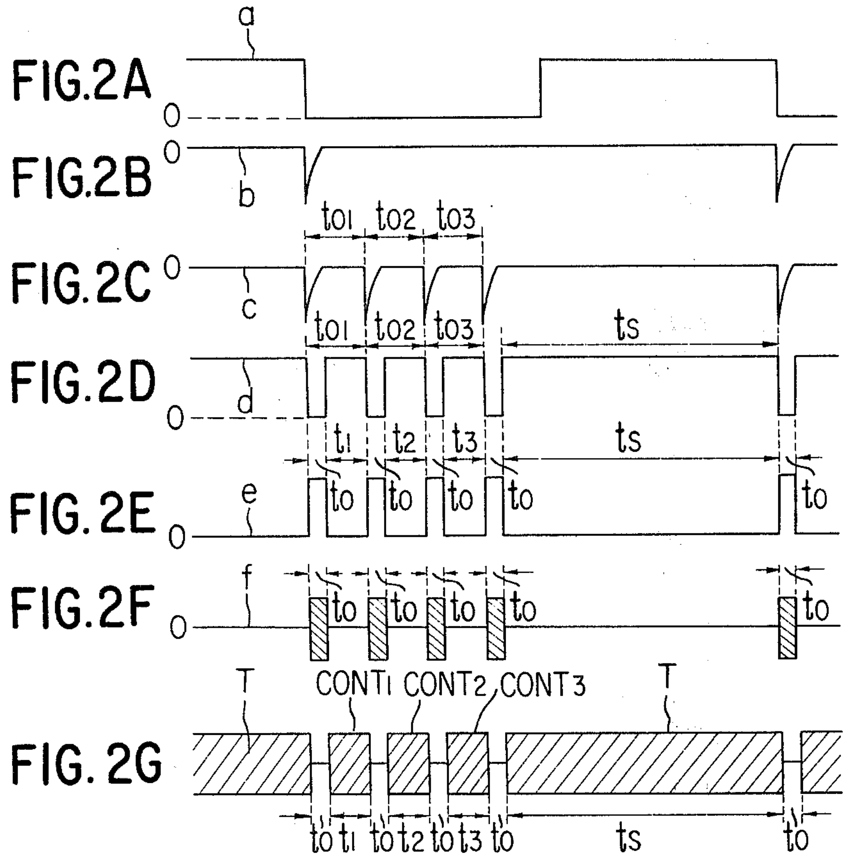

In FIG. 1, the reference numeral 1 generally shows the encoder, which comprises a rectangular wave oscillator 6, mono-stable multivibrators 7-1 through 7-3, variable resistors 8-1 through 8-3 for selecting the pulse widths in the respective mono-stable multivibrators 7-1 through 7-3, diodes 9-1 through 9-3, and differentiating circuits 10-1 through 10-3. The encoder 1 supplies a phase inverter 2 with signal $d$ as shown in FIG. 2D. The variable resistors 8-1 through 8-3 are mechanically coupled to the control stick for varying their value of resistance to alter the widths of the respective pulses. The numerals 3, 4 and 5 represent a gate circuit, a crystal oscillator and a power amplifier, respectively. The reference mark "SANT" represents the transmitting antenna.

The operation of the circuit will now be described with reference to FIGS. 2.

The rectangular wave oscillator 6 generates a rectangular wave $a$ as shown in FIG. 2A. Said rectangular wave is converted into a signal $b$ as shown in FIG. 2B through the differentiating circuit 10-1 and the diode 9-1, which signal $b$ is fed to the mono-stable multivibrator 7-1. Triggered by said signal $b$, the mono-stable multivibrator 7-1 produces a pulse of variable width determined by a built-in capacitor, not shown, and the variable resistor 8-1. The pulse produced by the mono-stable multivibrator 7-1 is fed through the differentiating circuit 10-2 and diode 9-2 to trigger the mono-stable multivibrator 7-2 to produce a pulse which is turn is fed through the differentiating circuit 10-3 and diode 9-3 to trigger the mono-stable multivibrator 7-3.

Therefore, the output wave form appearing at point C in FIG. 1 consists of a series of four consecutive negative differentiated pulses as shown in FIG. 2C. It is seen that, in FIGS. 2, the time length $t_{01}$ corresponds to the width of the pulse generated by the mono-stable multivibrator 7-1, the time $t_{02}$ corresponds to the width of the pulse generated by the mono-stable multivibrator 7-2, and the time length $t_{03}$ corresponds to the time width of the pulse generated by the mono-stable multivibrator 7-3.

The details of the phase inverter 2, gate circuit 3, crystal oscillator 4 and power amplifier 5 are not shown in FIG. 1. As shown in FIG. 2D, the output signal $d$ from the encoder 1 in FIG. 1 has its period constituted by three pulses having variable widths $t_1$, $t_2$, $t_3$, respectively, which correspond to said time lengths $t_{01}$, $t_{02}$, $t_{03}$ minus a time length $t_0$, respectively, and a pulse having a time width $t_s$. The signal shown in FIG. 2D is then converted into signal $e$ as shown in FIG. 2E through the phase inverter 2. Thus, the signal $e$ comprises a series of four consecutive pulses having a predetermined width of $t_0$ and spaced by time intervals of $t_1$, $t_2$, $t_3$, respectively. Said signal $e$ is then passed through the gate circuit 3, crystal oscillator 4 and power amplifier circuit 5 to be transmitted in the form of signal $f$ as shown in FIG. 2F.

In the case of conventional radio control systems the carrier wave is continuously transmitted for the period of each of the timing pulse T having a time width of $t_s$ and the control pulses having time widths of $t_1$, $t_2$ and $t_3$, respectively, as shown in FIG. 2G. In contrast to this, the present invention contemplates transmitting the carrier wave for such period as no carrier wave would exist in the case of the conventional system.

Figure 3:
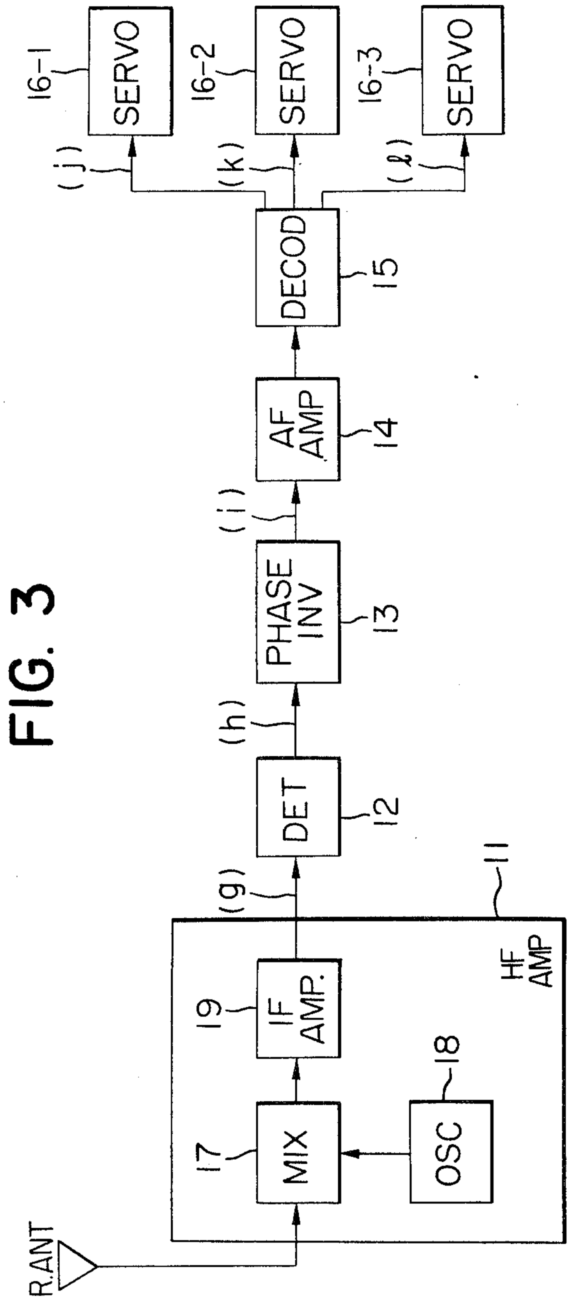
FIG. 3 is a block diagram showing a receiver embodying the invention, and FIGS. 4A–4F constitute a time chart showing the output wave forms for the period at various points in the above-mentioned receiver of the radio control system.

Referring to FIG. 3, the reference mark "RANT" represents a receiving antenna, and 11 represents a high frequency stage. This high frequency stage comprises a mixer 17, a local oscillator 18 and an intermediate frequency amplifier 19. The numeral 12 denotes a detection circuit, 13 a phase inverter, 14 an audio frequency amplifier, 15 a decoder, and 16-1 through 16-3 denote the servomechanisms.

Figures 4A, 4B, 4C, 4D, 4E, 4F:
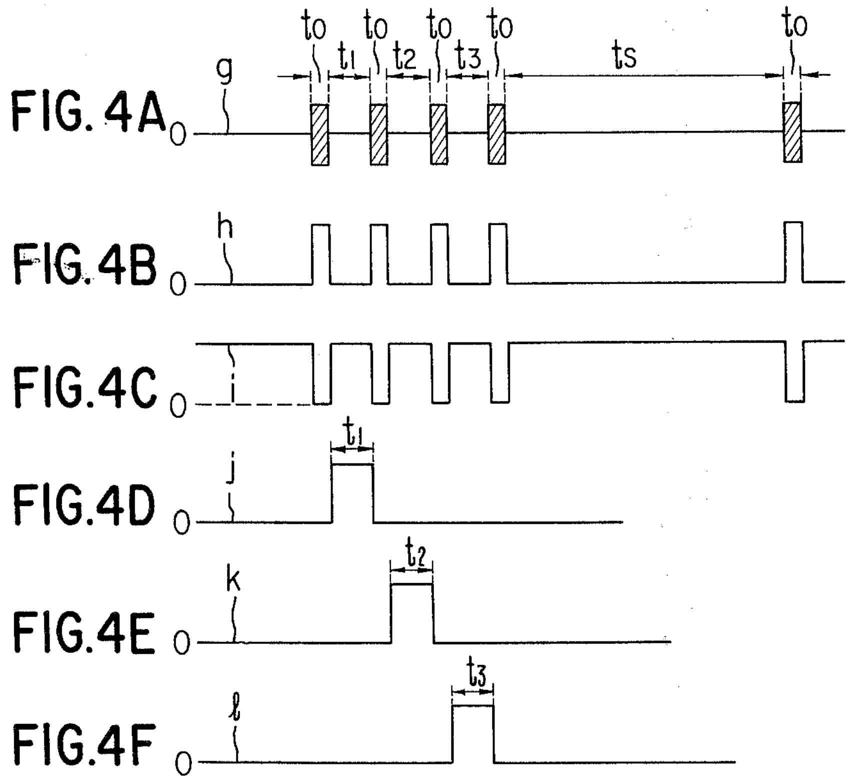

As stated before, the carrier wave radiated from the transmitter has been modulated by an intermittent signal whose period comprises three control pulses and one timing pulse as shown in FIG. 2F. When this is received, it gives rise to a signal *g* shown in FIG. 4A through the high frequency stage 11 of the above-mentioned construction. The signal *g* is fed to the detection circuit 12 where it is demodulated into signal *h* as shown in FIG. 4B. The signal *h* is converted by the phase inverter 13 into into a signal *i* as shown in FIG. 4C. This signal *i* is fed through the AF-amplifier 14 and decoder 15 into the servomechanisms 16-1 through 16-3. Thus the servomechanism 16-1 is supplied with a signal *j*, shown in FIG. 4D, of a pulse width corresponding to the stick operation made on the transmitter side, while the servomechanism 16-2 is supplied with a signal *k*, shown in FIG. 4E, of a pulse width corresponding to the stick operation and the servomechanism 16-3 is fed with a signal *l*, shown in FIG. 4F, of a pulse width corresponding to the stick operation. The servomechanisms can be controlled in dependence on the respective pulse widths $t_1$, $t_2$, $t_3$, respectively.

It is to be noted that for a signal *f* as shown in FIG. 2F to be sent from the transmitter, the encoder 1 itself may be modified so that it directly produces a signal *e* as shown in FIG. 2E and, on the part of the receiver, the decoder 15 itself may be modified so as to distribute the signals *j*, *k*, *l* directly from the signal *h* shown in FIG. 4B.

It is also to be noted that although the phase inverter 2 on the transmitter side has been inserted between the encoder 1 and the gate circuit 3 and the phase inverter 13 on the receiver side has been inserted between the detection circuit 12 and the audio frequency amplifier 14, the invention has no intention to limit the location of insertion of the phase inverters.

The phase inverters used in the invention mean circuits which can function for phase adjustment such that the transmitter will send a signal *f* as shown in FIG. 2F in response to the stick operation and the receiver will, in response to receiving the signal *g* shown in FIG. 4A, cause the signals shown in FIGS. 4D through 4F to be fed to the respective servomechanisms. Of course, such function may also be obtained by proper choice of the number of amplification stages.

It is seen that, according to the invention, the carrier wave is issued from the transmitter for the period $t_0$ of each of four consecutive pulses, if there are three channels, for instance, having time width of $t_0$ and therefore it is sufficient to transmit the carrier just for very short periods of time. In contrast to this, the conventional system is designed to transmit the carrier wave throughout the periods of the control pulses and the timing pulses. The invention thus makes it possible to greatly reduce the power transmitted from the controller in a radio control system. If a supply battery of the same capacity is built-in, the lifetime of the battery will be greatly multiplied in accordance with the invention as compared with the conventional system, and therefore a very economical radio control system is provided.

Also in accordance with the invention, it is needed only to insert phase inverters in the circuit arrangement of the conventional radio control system, it being not necessarily needed to change the construction of the encoder and the decoder used in the conventional radio control system.

What is claimed is:

1. In a radio control system which includes a transmitter having an encoder for generating control pulses of variable widths and a timing pulse, means for generating a carrier wave, and a transmitting antenna; a receiver having a receiving antenna and a decoder; and servomechanisms which are fed with the decoded signals from the decoder and are controlled in response to the widths of the control pulses, the improvement comprising means for restricting the carrier wave to be present throughout the time interval between the trailing edge of each control pulse and the leading edge of the next control pulse, to be present throughout the time interval between the trailing edge of the timing pulse and the leading edge of the first control pulse, and to be present throughout the time interval between the leading edge of the timing pulse and the trailing edge of the last control pulse, all of said time intervals being equal to each other, and wherein the control system responds to control signals having high and low levels and including said restricted carrier wave, said control signals comprising the aforesaid control pulses.

2. A radio control system as in claim 1 in which the encoder produces an output which assumes a high level for the period of existence of each control pulse and the timing pulse, and wherein said restricting means includes a phase inverter connected between the output of the encoder and the transmitting antenna, said control signals being transmitted from said transmitting antenna.

3. A radio control system as claimed in claim 2, in which said phase inverter comprises an amplifier stage.

4. A radio control system as in claim 1, in which the encoder produces an output which assumes a low level for the period of existence of each control pulse and the timing pulse, and wherein said restricting means includes a phase inverter connected between the output of the encoder and the transmitting antenna, said control signals being transmitted from said transmitting antenna.

5. A radio control system as claimed in claim 4, in which said phase inverter comprises an amplifier stage.

6. A radio control system as in claim 1, in which the servomechanisms are fed with an input signal which assumes a high level for the period of existence of each control pulse and the timing pulse, and wherein said restricting means includes a phase inverter connected between the receiving antenna and the servomechanisms, said servomechanisms being controlled by said control signals received.

7. A radio control system as claimed in claim 6, in which said phase inverter comprises an amplifier stage.

8. A radio control system as in claim 1, in which the servomechanisms are fed with an input signal which assumes a low level for the period of existence of each control pulse and the timing pulse, and wherein said restricting means includes a phase inverter connected between the receiving antenna and the servomechanisms, said servomechanisms being controlled by said control signals received.

9. A radio control system as claimed in claim 8, in which said phase inverter comprises an amplifier stage.

10. A radio control system as in claim 1 and wherein said encoder includes a rectangular wave oscillator, a plurality of serially connected monostable multivibrators connected to said oscillator, a corresponding plurality of variable resistors for selecting the pulse widths from the monostable multivibrators each of said resistors associated with a corresponding multivibrator, a plurality of differentiating circuits and a plurality of diodes, each of said differentiating circuits being connected through a corresponding one of the diodes to the input of a corresponding multivibrator, and said transmitter further comprising in series circuit arrangement, gate means controlling the operation of said oscillator and amplifier means amplifying the output from said oscillator, said series circuit arrangement being interconnected between said encoder and said transmitting antenna, and wherein said restricting means includes a phase inverter connected in series circuit arrangement.

11. A radio control system as in claim 1 and wherein said receiver includes in series circuit arrangement an amplifier and a detector and wherein said restricting means includes a phase inverter connected in said series circuit arrangement.

* * * * *